(12) United States Patent
Lerche et al.

(10) Patent No.: US 9,753,146 B2
(45) Date of Patent: Sep. 5, 2017

(54) PIXEL IDENTIFICATION FOR SMALL PITCH SCINTILLATION CRYSTAL ARRAYS

(71) Applicant: KONINKLIJKE PHILIPS N.V., Eindhoven (NL)

(72) Inventors: Christoph Werner Lerche, Herzogenrath (DE); Poornima Sampath, Aachen (DE); Torsten Solf, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/911,052

(22) PCT Filed: Aug. 13, 2014

(86) PCT No.: PCT/EP2014/067310
§ 371 (c)(1),
(2) Date: Feb. 9, 2016

(87) PCT Pub. No.: WO2015/022354
PCT Pub. Date: Feb. 19, 2015

(65) Prior Publication Data
US 2016/0187497 A1 Jun. 30, 2016

(30) Foreign Application Priority Data

Aug. 14, 2013 (EP) .................................... 13180371

(51) Int. Cl.
*G01T 1/20* (2006.01)
*G01T 1/164* (2006.01)
(52) U.S. Cl.
CPC .................................. *G01T 1/1647* (2013.01)
(58) Field of Classification Search
CPC ....... G01T 1/1644; G01T 1/1648; G01T 7/05; G01T 1/40; G06T 11/005
See application file for complete search history.

(56) References Cited

U.S. PATENT DOCUMENTS 6,407,392 B1 6/2002 Tsuyuki et al.
8,294,112 B2 10/2012 Levene et al.
(Continued)

FOREIGN PATENT DOCUMENTS

WO 03/096070 11/2003

OTHER PUBLICATIONS

Hunter et al., "A comparison of Maximum list-mode-likelihood estimation and Maximum-likelihood clustering algorithms for depth calibration in continuous-crystal PET detectors," 2012, IEEE Nuclear Science Symposium and Medical Imaging Conference Record, pp. 3829-3834.*

(Continued)

*Primary Examiner* — Kiho Kim

(57) ABSTRACT

Spatial intensity distributions of scintillation photons emitted by the scintillator array (5) in response to multiple incident gamma rays in record are recorded (S10). Sets of coincidently emitted scintillation photons from the recorded spatial intensity distributions are determined (S22). The sets of coincidently emitted scintillation photons center-of-gravity positions (S24) and cumulative energies are determined (S26). A clustering analysis based on the determined center-of-gravity positions and cumulative energies to obtain clusters (26a, 26b, 33) of gamma ray events attributed to a scintillator array element is performed (15). A cluster (26a, 26b, 33) of the spatial intensity distributions is cumulated (S29) to determine a cumulative spatial intensity distribution of scintillation photons emitted in response to incident gamma rays in the scintillator array element. A light matrix including expected spatial intensity distributions of scintillation photons for different scintillator array elements (15) is determined (S30) based on the cumulative spatial intensity distributions.

19 Claims, 8 Drawing Sheets

(56) References Cited

U.S. PATENT DOCUMENTS

2004/0159792 A1   8/2004  Andreaco et al.
2011/0121192 A1   5/2011  Moriya et al.
2011/0266450 A1   11/2011 Majewski et al.

OTHER PUBLICATIONS

Lerche, et al., "Maximum Likelihood Based Positioning and Energy Correction for Pixelated Solid State PET Detectors", Nuclear Science Symposium and Medical Imaging Conference Record, 2011, pp. 3027-3029.
Yoshida, et al., "Calibration Procedure for a DOI Detector of High Resolution PET Through a Gaussian Mixture Model", IEEE Transactions on Nuclear Science, vol. 51, No. 5, Oct. 2004.
Zoick, et al., "3D Millimeter Event Localization in Bulk Scintillator Crystals", IEEE Transactions on Nuclear Science, vol. 60, No. 2, Apr. 2013.
Fraley, et al., "Software for Model-Based Cluster Analysis", Journal of Classification, Jul. 1999, vol. 16, Issue 2, pp. 297-306.
Valastyan, et al., "Experimental scanner setup from miniPET II detector module", Nuclear Science Symposium Conference Record, 2008.
Levin, et al., "Current Trends in Preclinical PET System Design", Position Emission Tomography, PET Clin 2, 2007.
Larobina, et al., "Small Animal PET: A Review of Commercially Available Imaging Systems", Current Medical Imaging Reviews, 2006, 2, 187-192.

* cited by examiner

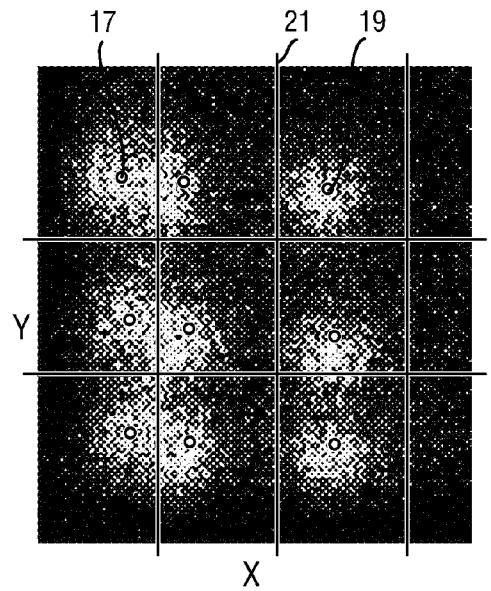 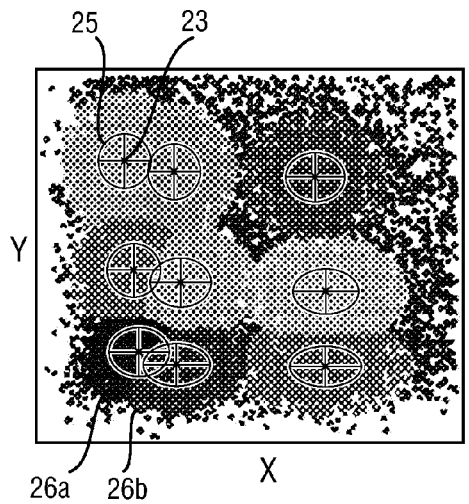
FIG.5       FIG.6
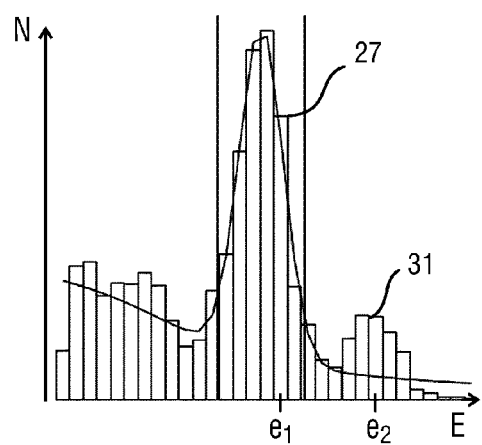 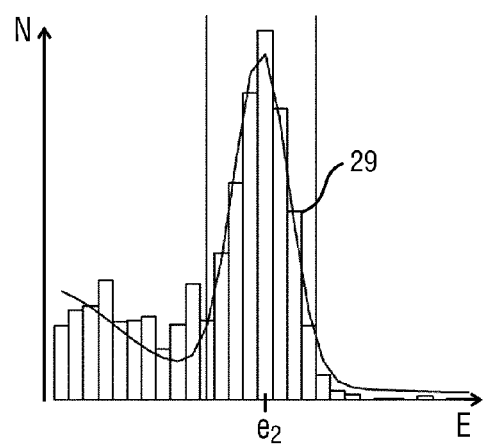
FIG.7

PIXEL IDENTIFICATION FOR SMALL PITCH SCINTILLATION CRYSTAL ARRAYS

CROSS REFERENCE TO RELATED APPLICATIONS

This application is the U.S. National Phase application under 35 U.S.C. §371 of International Application No. PCT/EP2014/067310, filed Aug. 13, 2014, published as WO 2015/022354 on Feb. 19, 2015, which claims the benefit of European Patent Application Number 13180371.0 filed Aug. 14, 2013. These applications are hereby incorporated by reference herein.

FIELD OF THE INVENTION

The present invention relates to a calibration method and module for a gamma ray detector, to a gamma ray detector and to a medical imaging device.

BACKGROUND OF THE INVENTION

Gammy ray and X-ray imaging detectors are used as part of imaging devices, e.g. positron emission tomography (PET) and single-photon emission computed tomography (SPECT) in medical and other applications. Such imaging detectors usually comprise a scintillation detector or a scintillator, e.g. a scintillator crystal or an array of scintillator crystals, coupled to a photodetector, e.g. an array of photosensitive elements. The scintillator scintillates, i.e. emits light flashes, in response to incoming, i.e. impinging, particles such as electrons, alpha particles, ions or high-energy photons. The emitted photons are captured by the photodetector, which, in turn, is read out by dedicated read-out electronics. Based on where and when scintillation photons are captured (i.e. the intensity distribution or spatial intensity distribution of the charges on the photodetector which may also be referred to as charge distribution), the temporal and spatial position and of the incident particles in the scintillator may be determined. Therefrom, an image representing this position may be generated. This image comprises information on where and when the respective particle was emitted, which can be exploited by medical or other imaging devices by introducing a substance emitting particles or by causing the emission of particles at certain areas in other ways. If, e.g., a patient is administered a radioactive tracer emitting a certain kind of particles (possibly in response to a metabolic reaction) an image can be generated as a representation of where these particles were emitted. Alternatively a gamma ray detector may also detect gamma rays emitted by a gamma ray source and interacting with an object (e.g. a patient) on their way to the detector.

One important issue in the context of such imaging approaches is the provided image resolution. This resolution depends on various factors such as the design of the photodetector or the scintillator (e.g. size or pitch of the photodetector array or the scintillator array in case arrays are used), the data processing and the used algorithms, the calibration of the different components, material properties (size, quality, . . . ), external conditions or other influences. The scintillator comprised in the detector may, e.g. comprise a single (monolithic) block, which results in a continuous distribution of the emitted scintillation photons (light distribution) in response to incident particles to be sampled and analyzed. Alternatively the scintillator may comprise an array of small crystal needles, which results in an intrinsic spatial resolution of the imaging detector given by the pitch of those needles. A higher number of crystal needles per area, i.e. smaller needles and/or more needles may, e.g., increase the resolution in that the positions of the incident particles can be determined with higher precision.

Thus, improving the intrinsic spatial resolution of such an imaging detector may be achieved by decreasing the pitch of the crystal elements in a scintillator array. Making the pitch of the crystal elements smaller, however, leads to a higher number of crystal elements that have to be correctly identified. There are two main strategies for the identification of the crystal being subject to the incident particle: either each individual scintillator crystal element can be individually read out by means of a dedicated photodetector element or the light-sharing method can be used. According to the light-sharing method, the pitch of the scintillator array is usually smaller than the pitch of the photo-detector array so that several crystal elements are placed over a single photodetector array pixel. In order to identify the respective crystal needles, i.e. the scintillator array element that was hit by the incident particle, it may then be evaluated how the scintillation light is distributed over multiple photodetector elements. In order to improve the detection and correct identification of the crystal needle a lightguide, i.e. an optical homogenous and transparent solid material, may be used for spreading the scintillation light over several photodetector array pixels. The distribution of the scintillation photons, i.e. the scintillation light or scintillation flash, over the photosensitive elements of the photodetector array may then be analyzed for identifying the scintillator array element that was hit. Further, the energy of the incident particle can be determined. However, extraction of the correct parameters (time, energy and position of the impact) is usually more difficult if light-sharing is used instead of individually reading out each scintillator array element. On the other hand, the required number of photosensitive elements in the photodetector (photodetector pixels) and the complexity of the data acquisition system may be reduced significantly, which may lead to lower device costs. For instance, modern clinical PET scanners have a number of scintillator crystal elements on the order of $10^4$ to $10^5$. The pitch of the arrays is usually approximately 4 mm leading to an intrinsic spatial resolution of about 4 mm. If each scintillator crystal array element is read out individually the same amount of photosensitive elements in the photodetector (photodetector pixels) and electronic channels would be required. The use of the light-sharing method can reduce the number of required photodetector pixels and electronic channels by an order or magnitude.

However, making use of the light-sharing method may also lead to disadvantages. For instance, in gamma ray detectors based on light-sharing the crystal, i.e. the crystal element, that is hit by an incident gamma ray and the energy of this gamma ray has to be extracted from a set of signals from all affected photosensitive elements in the photodetector, which usually requires an additional computation step. For positioning, the most widely used method is anger-positioning, i.e. the determination of the center-of-gravity or the centroid of the distribution. Anger-positioning is, however, heavily affected by missing signals, caused, e.g., by dead photosensitive elements in the photodetector or by the dead-time of one or more photosensitive elements. In Lerche et al., Maximum Likelihood Based Positioning and Energy Correction for Pixelated Solid State PET Detectors, Nuclear Science Symposium and Medical Imaging Conference Record, 2011, pp. 3027-3029, the authors present an alternative method for determining the position of an incident gamma ray and extracting the respective parameters. The approach is based on the Maximum Likelihood method. The most likely photo-conversion position in a scintillator array coupled to a photodetector array in light-sharing mode is determined by comparing the resulting light distribution with predetermined distributions for different photo-conversion positions in the scintillator. The most likely position, i.e. the position corresponding to the most similar light distribution, is used as an estimate for the photo-conversion position in the scintillator of the incident gamma ray. The authors show that the resolution of medical images may be improved by using the Maximum Likelihood position estimation method.

It is, however, not further detailed how the necessary reference distributions for the comparison are to be obtained.

In Yoshida et al., Calibration Procedure for a DOI Detector of High Resolution PET Through a Gaussian Mixture Model, IEEE TRANSACTIONS ON NUCLEAR SCIENCE, VOL. 51, NO. 5, October 2004, a depth of interaction detector is developed for the next generation of positron emission tomography (PET) scanners. A statistical model based on the approach of a Gaussian mixture model (GMM) is introduced for crystal identification. The results of this method are used to generate a look-up-table.

In Ziock et al., 3D Millimeter Event Localization in Bulk Scintillator Crystals, IEEE TRANSACTIONS ON NUCLEAR SCIENCE, VOL. 60, NO. 2, April 2013, a new technique to achieve a high level of performance through the use of close-coupled, coded-aperture shadow masks placed between the crystal and a position-sensitive phototransducer is presented.

SUMMARY OF THE INVENTION

It is an object of the present invention to provide a calibration method and module for a gamma ray detector to provide an improved resolution when used for imaging. It is further an object of the present invention to provide a gamma ray detector, a medical imaging device and a computer program.

In a first aspect of the present invention there is presented a calibration method for a gamma ray detector including a scintillator array for emitting scintillation photons at photo conversion positions in response to incident gamma rays and a photodetector array coupled thereto in light-sharing mode for determining a spatial intensity distribution of scintillation photons. This method comprises the steps of recording a spatial intensity distribution of scintillation photons emitted by the scintillator array in response to multiple incident gamma rays, determining sets of coincidently emitted scintillation photons from the recorded spatial intensity distributions, determining for the sets of coincidently emitted scintillation photons center-of-gravity positions and cumulative energies, performing a clustering analysis based on the determined center-of-gravity positions and cumulative energies to obtain clusters of gamma ray events attributed to a scintillator array element, cumulating for a cluster the spatial intensity distributions to determine a cumulative spatial intensity distribution of scintillation photons emitted in response to incident gamma rays in the scintillator array element, determining a light matrix including expected spatial intensity distributions of scintillation photons for different scintillator array elements based on the cumulative spatial intensity distributions.

In another aspect of the present invention there is presented a calibration module for a gamma ray detector including a scintillator array for emitting scintillation photons at photo conversion positions in response to incident gamma rays and a photodetector array coupled thereto in light-sharing mode for determining the spatial intensity distribution of the scintillation photons. This module comprises a recorder for recording the spatial intensity distributions of scintillation photons emitted by the scintillator array in response to multiple incident gamma rays, a cumulation module for determining sets of coincidently emitted scintillation photons from the recorded spatial intensity distributions, determining for the sets of coincidently emitted scintillation photons center-of-gravity positions and cumulative energies, performing a clustering analysis based on the determined center-of-gravity positions and cumulative energies to obtain clusters of gamma ray events attributed to a scintillator array element, cumulating for a cluster the spatial intensity distributions to determine a cumulative spatial intensity distribution of scintillation photons emitted in response to incident gamma rays in the scintillator array element, a matrix module for determining a light matrix including expected spatial intensity distributions of scintillation photons for different scintillator array elements based on the cumulative spatial intensity distributions.

In another aspect of the present invention there is presented a gamma ray detector comprising a scintillator array for emitting scintillation photons at photo conversion positions in response to incident gamma rays, a photodetector array coupled to the scintillator array in light-sharing mode for determining a spatial intensity distribution of scintillation photons and a calibration module according to the above-described aspect of the present invention.

In yet another aspect of the present invention there is presented a medical imaging device comprising a gamma ray detector as disclosed herein. In yet further aspects of the present invention, there are provided a computer program which comprises program code means for causing a computer to perform the steps of the calibration method disclosed herein when said computer program is carried out on a computer as well as a non-transitory computer-readable recording medium that stores therein a computer program product, which, when executed by a processor, causes the calibration method disclosed herein to be performed.

Preferred embodiments of the invention are defined in the dependent claims. It shall be understood that the claimed module, device, computer program and medium have similar and/or identical preferred embodiments as the claimed calibration method and as defined in the dependent claims.

A gamma ray hits an array of scintillating elements, i.e. a scintillator array, at a certain position, i.e. a photo-conversion position, and causes the emission of a light flash, i.e. scintillation photons, in the scintillator. The photodetector array is coupled to the scintillator array such that the scintillation photons emitted in one element of the scintillator array are distributed over multiple photosensitive elements of the photodetector array, i.e. light-sharing is used. The photodetector array thus allows recording a spatial intensity distribution of the emitted scintillation photons. Based on the recorded spatial intensity distributions of a plurality of incident gamma rays the cumulative spatial intensity distribution of the scintillation photons emitted in response to incident gamma rays in a single scintillator array element, i.e. one specific scintillator array element, is determined. This cumulative spatial intensity distribution is determined for multiple scintillator array elements. Based thereupon, there is determined a light matrix which includes an expected spatial intensity distribution for the different scintillator array elements. The presented method thus allows determining a reference distribution which may, e.g., be used in a Maximum Likelihood based gamma ray positioning method i.e. for comparing a recorded distribution for a single event to reference distributions and selecting the most likely reference distribution. One advantage of the calibration method according to the present invention is that it allows determining these reference distributions, i.e. the light matrix that can be used in order to determine photoconversion positions in the scintillator by means of, e.g., the Maximum Likelihood method.

According to the present invention determining the cumulative spatial intensity distributions of scintillation photons emitted in response to incident gamma rays in a scintillator array element includes determining sets of coincidentally emitted scintillation photons from the recorded spatial intensity distributions, determining the center-of-gravity positions for the spatial intensity distributions of the determined sets of coincidentally emitted scintillation photons, performing a clustering analysis based on the determined center-of-gravity positions and determining for the clusters the corresponding cumulative spatial intensity distributions.

Thus, in order to determine the cumulative spatial intensity distribution resulting from incident gamma rays in one scintillator array element it is initially determined which scintillation photons have been emitted coincidentally (or within a short time period). By this, single incident gamma rays (or gamma ray events) can be identified and separated. Thus, based thereupon, the spatial intensity distribution of the scintillation photons emitted in response to a single incident gamma ray can be determined. This spatial intensity distribution generated in response to one gamma ray can then be analyzed in order to obtain an estimate for the position of the incident gamma ray on the scintillator array. This estimated position may be determined by calculating the center-of-gravity position from the spatial intensity distribution of each of the determined sets of coincidentally emitted scintillation photons. For each single gamma ray the respective estimated position can be determined. Thus, a plurality of center-of-gravity positions (i.e. anger positions) is determined, representing the individual gamma ray events. In the next step these determined center-of-gravity positions are grouped into clusters by means of a clustering analysis. Clustering analysis refers to grouping the determined positions. Usually the clusters are based on proximity with respect to a multidimensional space. Positions may, e.g., be grouped into clusters with positions that are spatially close to one another. Cluster analysis or clustering thereby refers not to a particular algorithm but rather to different possible algorithmic approaches.

Depending on the mechanical construction of the gamma ray detector the determined clusters may already allow differentiating between the single elements of the scintillator array, i.e. the center-of-gravity positions resulting from incident gamma rays in one specific scintillator-array element are grouped into the same group in the clustering analysis. Based on the clustering analysis and the determined clusters of gamma ray events (represented, e.g., by their center-of-gravity positions), it can be determined which of the gamma ray events are attributed to the same scintillator array element. For this, it may be assumed that each cluster corresponds to a scintillator array element. It is also possible to include prior information such as a predetermined grid structure or expected positions based on the geometric properties of the scintillator array and the photodetector array into the clustering analysis. For determining the cumulative intensity distributions (for each cluster, i.e. for each scintillator array element) the intensity distributions on the photodetector of the gamma ray events of one group (i.e. cluster) are combined.

According to the invention the calibration method further comprises the step of determining the cumulative energies of the determined sets of coincidentally emitted scintillation photons, wherein the clustering analysis is additionally based on the determined cumulative energies of the determined sets of coincidentally emitted scintillation photons.

There is not only determined the center-of-gravity position for each of the sets of coincidentally emitted scintillation photons (gamma ray events), but also the cumulative energy. The cumulative energy thereby refers to the combined energy of the different photosensitive elements of the photodetector. Thus, the cumulative energy may be interpreted as a measure for the energy of one incident gamma ray represented by one set of coincidentally emitted scintillation photons. By additionally determining the energy of each of the sets there is determined an additional parameter to be used in the clustering analysis. The clustering analysis may also be based on this determined cumulative energy apart from the (usually two-dimensional, 2D) center-of-gravity position of the respective gamma ray or set of coincidentally emitted scintillation photons. One advantage of also including the energy is that the clustering analysis may allow better distinguishing between the sets of coincidentally emitted scintillation photons representing gamma rays that have entered the scintillator array in the same scintillator array element.

Obviously, the center-of-gravity positions of the respective distribution of the scintillation photons generated in response to one gamma ray event are a good distinguishing feature when trying to group all gamma ray events in one scintillator array element into the same group. However, apart from the position also the energy values are a good distinguishing feature for the different scintillator array elements, in particular if mono-energetic gamma rays are used. One reason therefor results from tolerances in the fabrication process of the individual crystals or crystal arrays. Usually, the light yield of the different crystal array elements (pixels) is different from one another. Thus, using the energy as a feature can help to distinguish between the different scintillator array elements. Further, the out-coupling of the scintillation light flash, i.e. the emitted scintillation photons, in one crystal array element is subject to differences in the surface treatment and surface properties of this individual crystal pixel. This may also lead to different energy values for the different scintillator array elements. Still further, differences between the different crystal array elements may result from variances in the reflection efficiency or the reflector quality of the reflector sheets that cover the individual crystal array elements. Still further, the glue layers (usually light conductive glue is used) between scintillator array, lightguide and photodetector may also be subject to fabrication tolerances. Thus, if the gamma ray beam used during calibration predominantly comprises particles of the same energy level (mono-energetic gamma rays or gamma ray beam), the detected differences in the energy result cannot result from variations in the incident radiation and allow for differentiation between the scintillator array elements. After the calibration the use of mono-energetic radiation can be omitted since the energy is then computed by the Maximum Likelihood method.

An advantage of making use of the energy values in the clustering analysis is that the light collection efficiency of the photodetector as well as the gain variation of the different photosensitive elements (pixels) in a photodetector varies. For instance, silicon photo multipliers (SIPM) are single devices and cannot provide any intrinsic spatial information (therefore, they are usually arranged in arrays).

This, however, may lead to gaps between two adjacent SIPM pixels. These gaps may be larger than the single crystal elements in a scintillator array. Scintillation photons that impact in the area of such a gap cannot be registered by the photodetector. Thus, the light collection efficiency is lower on certain positions, i.e. varies. For the whole photodetector array this may lead to a considerable variation in the light collection efficiency and, thus, to a strong variation in the detected energy values for the single gamma rays depending on the specific scintillator array element being subject to the impact of the gamma ray. Still further the inherent gain of the different photosensitive elements may vary. All these effects result in different energy values recorded by the photosensitive elements for gamma rays hitting different scintillator array elements even if the gamma rays initially have a comparable energy. The energy is thus a useful distinguishing feature and can be used in the clustering analysis in addition to the (spatial) position of the center-of-gravity of the respective intensity distribution on the photodetector resulting of one gamma ray event (incident gamma ray). It is also possible to use other parameters cluster analysis such as, e.g., the standard deviation or higher moments of the signal distribution along the x- and y-axis or the energy.

In another embodiment of the present invention performing the clustering analysis includes using a standard clustering algorithm based on hierarchical clustering, centroid based clustering, distribution based clustering, density based clustering or Maximum Likelihood Expectation Maximization Clustering.

As outlined above, clustering refers to the general task to be solved and not to one specific algorithm. According to the present invention, possible algorithms to be used for the clustering may be based on different approaches. Hierarchical clustering thereby makes use of the distances between the single events, i.e. the differences in the position and energy of the sets of coincidentally emitted scintillation photons. The distance may be calculated based on different metrics such as Euclidean or Manhattan distances or others. Centroid based clustering may also be referred to as k-means clustering wherein the variable k refers to a predefined number of clusters into which the data points are to be grouped. This approach may be especially useful when trying to determine one cluster for each scintillator array element. Distribution based clustering makes use of the assumption that each cluster represents a certain statistical distribution of events. The clustering is then based on extracting the most likely distributions from the data set. If, i.e., a normal distribution is assumed for each cluster, the events are grouped into clusters that resemble such a normal distribution. Density-based clustering refers to a method that assumes that each cluster is defined as an area that has a higher density of data points in comparison to the remainder of the data set. Then, such a higher density area is defined to represent one cluster. Maximum Likelihood Expectation Maximization clustering refers to an iterative method for assigning each data point, i.e. center-of-gravity positioned and energy value, to one of a set of predefined clusters. Alternatively, other parameters derivable from the obtained spatial intensity distribution may be used in the clustering analysis. The MLEM algorithm may thereby be initiated with a randomly chosen model, i.e. assumed clusters, and iteratively re-assign the data points to the model, redefine the model and increase quality measure. According to the present invention it is particularly useful to use the assumption of a regular grid defined by the design of the scintillator array as prior information. Using such assumptions is usually referred to as including prior information (also referred to as priors). It may, e.g., be assumed that the centroid of each scintillator array represents one cluster. Then the events are individually attributed to one of the clusters exploiting both the prior information (i.e. the spatial position of the centroid of the scintillator array element) and the events that have already been attributed to this cluster.

In another embodiment of the present invention the expected spatial intensity distributions are determined based on normalizing the determined cumulative spatial intensity distributions. This normalization thereby refers to standardizing, i.e. calibrating the recorded cumulative energy for the different scintillator array elements to a specific value. Thus, the scintillation photons emitted in response to incident gamma rays in one specific scintillator array element are normalized so that the effect of the duration of the initial recording or flooding is compensated. One advantage of normalizing the determined cumulative spatial intensity distributions is that it then becomes possible to determine therefrom the expected distribution for one single incident gamma ray. This can be used as a basis for the Maximum Likelihood estimation of the position of an incident gamma ray. The intensity distribution determined for an incident gamma ray event is compared to different previously available reference distributions and the most likely corresponding reference distribution is selected. The current event is then assumed to correspond to the event associated with this selected most likely reference distribution. For this, it is also possible to use different metrics in the comparison of the recorded intensity distribution with the reference distribution. Herein, the cumulative spatial intensity distributions may particularly refer to the distributions of the groups (clusters) determined in the clustering analysis as lined out above.

In another embodiment, the determined sets of coincidentally emitted scintillation photons are divided into groups including all sets of coincidentally emitted scintillation photons with their centers-of-gravity over the same photodetector array element and a separate clustering analysis is performed for each group. Thus, the data points, i.e. the sets of coincidentally emitted scintillation photons, are subdivided into different groups before the clustering is performed. Then, the clustering sets of coincidentally emitted scintillation photons and determining the sets representing scintillation photons emitted in response to gamma rays interacting with one specific scintillator array element can be performed for each subgroup. By subdividing the data point into different groups prior to performing the clustering analysis, the computational effort for performing the clustering analysis may be decreased. This may make the clustering faster and/or more efficient.

According to another embodiment of the present invention there is provided a gamma ray detector comprising a scintillator array for emitting scintillation photons at photo conversion positions in response to incident gamma rays, a photodetector array coupled to the scintillator array in light-sharing mode for determining the spatial intensity distribution of the scintillation photons and a calibration module according to an aspect of the present invention as described above. By including such a calibration module into a gamma ray detector, this gamma ray detector may be operated based on the Maximum Likelihood determination of the position of an incident gamma ray in the scintillator array, i.e. the respective element of the scintillator array. The calibration module thereby performs a calibration method as described above. This calibration method may be carried out only once, e.g. when manufacturing or installing the detector, or based on a regular interval in order to account for changing external or internal conditions such as material degradation, weather, position, or others.

In another embodiment this gamma ray detector further comprises a lightguide interposed between the scintillator array and the photodetector array for guiding the emitted scintillation photons from the scintillator array to the photodetector array. Such a lightguide allows spreading the emitted scintillation photons, i.e. the scintillation light flash caused by an incident gamma ray, over different photosensitive elements in the photodetector array. An advantage of using a lightguide is that fewer scintillation photons are lost due to refraction, reflection or other effects.

In one embodiment of the gamma ray detector the lightguide comprises a high refractive index material with a refractive index higher than the refractive index of the photodetector array's entrance window. In one embodiment the high refractive material includes sapphire glass. Thereby, the photodetector array's entrance window refers to the layer being coupled to the lightguide. This layer usually comprises a transparent material such as light conductive glue. By designing the lightguide based on sapphire glass (or generally based on a high refractive index material, in particular a high refractive glass) more light is directed to the photosensitive elements of the photodetector array (photodetector pixels) close to the scintillator array element that was hit by the gamma ray. The comparably high refractive index of sapphire glass thereby helps to guide the light close to an axis perpendicular to the scintillator array and the photodetector array. It is further advantageous to use high refractive light conducting glue in combination with the lightguide in order to reinforce or at least not constrain the effect of a high refractive index material lightguide.

In another aspect of the present invention the gamma ray detector further comprises an image module for determining a gamma ray intensity image from a Maximum Likelihood estimation of the photo conversion positions of incident gamma rays based on the light matrix. The light matrix is obtained from the calibration module. The data comprised in the light matrix is used as reference distributions for the different elements of the scintillator array. The recorded spatial intensity distribution of an incident gamma ray is compared to these reference distributions and a similarity value is determined for each reference distribution. Then, the scintillator array element leading to the highest similarity value is chosen as an estimate for the scintillator array element that was hit by the currently recorded gamma ray.

In another aspect of the present invention there is presented a medical imaging device comprising a gamma ray detector as lined out above. Such a medical imaging device could be a PET or SPECT device for obtaining images of a body or parts of a body of a patient. Alternatively, such an imaging device may also be used in preclinical or veterinary examinations where, e.g. small animals are examined as part of research studies.

Advantages of the present invention particularly include a better image quality in comparison to previous detectors or imaging devices due to the use of the calibration method or calibration module according to the present invention.

BRIEF DESCRIPTION OF THE DRAWINGS

These and other aspects of the invention will be apparent from and elucidated with reference to the embodiment(s) described hereinafter. In the following drawings

FIG. 5 shows an illustration of a plurality of center-of-gravity positions for the spatial intensity distributions of sets of coincidentally emitted scintillation photons;

FIG. 6 shows an illustration of the result of a 2D clustering analysis;

FIG. 7 illustrates an example for the energy spectra of two clusters determined based on 2D clustering;

DETAILED DESCRIPTION OF THE INVENTION

Gamma ray detectors including a scintillator array coupled to a photodetector array in light-sharing mode provide the advantage that the resolution of the scintillator array can be higher than the resolution of the photodetector array, i.e. the scintillator array may comprise more scintillating elements than the photodetector comprises photosensitive elements. This may lead to less complex readout electronics for the photodetector array. The achievable image resolution might, however, be lower than if each scintillator array element is read out individually. If individual readout is used the image spatial resolution at the isocenter of the imaging device is linked to the intrinsic resolution of the array by a factor of about 0.5. For instance, if a 1 mm crystal pitch scintillator array is individually read out by an appropriate photodetector array, an image spatial resolution of 0.5 mm may be achieved. In contrast thereto, if light-sharing is used, the image spatial resolution at the isocenter is linked to the intrinsic resolution by a factor of about 1. Thus, e.g. a PET scanner with a 1 mm crystal pitch scintillator array may achieve approximately 1 mm image spatial resolution at the isocenter. Apart from the pixel size, there are however other physical factors limiting the resolution that cannot be altered easily. An example for this can be found in the positron range and residual non-collinearity of the two 511 keV annihilation photons in case of PET imaging. This residual non-collinearity is due to the momentum of the annihilation electron and may lead to a 0.47° FWHM (full-width-half-maximum) variation around the 180° back-to-back angle of the annihilation radiation.

However, reducing the scintillator array pixel size can usually be regarded as a promising approach to increase the image resolution. The problem remains that, if each pixel is to be read out individually, a high number of electronic channels are required for reading out the photodetector array. Making use of light-sharing readout allows avoiding this problem.

Figure 1:
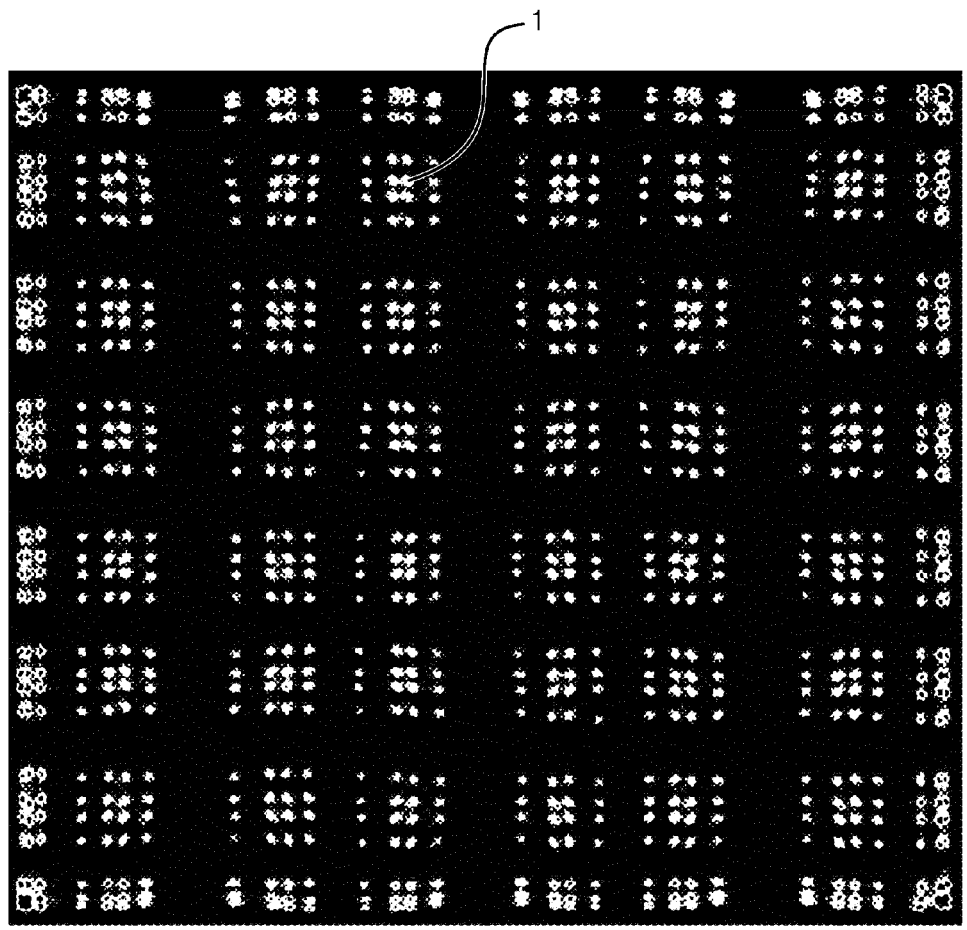
FIG. 1 illustrates an example of a flood image captured with a photodetector.

FIG. 1 shows an example for a flood image of a gamma ray detector irradiated by means of a Na$^{22}$ source (point source). This gamma ray detector comprises a 30×30 scintillator array with 1 mm pitch and an 8×8 photodetector array with 4 mm pitch. According to the present invention, the photodetector may, e.g. comprise an array of photo multipliers (PMT), a position sensitive photo multiplier (PSPMT), an array of avalanche photo diodes (APD), position sensitive avalanche photo diodes (PSAPD) or an array of silicon multipliers (SiPM). The bright spots 1 in FIG. 1 represent the images of the scintillator array element pixels. For each obtained charge distribution (spatial intensity distribution) the center-of-gravity is determined. The 2D histogram of the center-of-gravity values is illustrated.

It can be seen that, although the scintillator array is regularly designed (regular 1×1 mm pitch, tolerance 50 μm), the grid observed by the photodetector as illustrated in FIG. 1 is not. One reason for this is that the photodetector array includes spaces between the photosensitive elements resulting in varying light collection efficiency.

Further, there exist gain tolerances between the photosensitive elements of the photodetector array as well as variations in the light yield of the individual scintillator array elements.

Still further, for the scintillator array elements at the border of the detector the light distribution is cut off leading to systematic errors. This may result in the effect that the images of the outer scintillator array rows and columns are nearly superposed (border effect). For correctly identifying which scintillator array element was the source of the scintillation (i.e. where the gamma ray interacted) and for correct imaging based thereupon these errors have to be calibrated out.

The exemplary flood map of FIG. 1 thus illustrates two important problems. On the one hand, the images of the outer rows and columns of the scintillator array are hard to separate. On the other hand, also the bright spots closer to the center of the detector are not arranged regularly in spite of the regular construction of the scintillator array.

Figure 2:
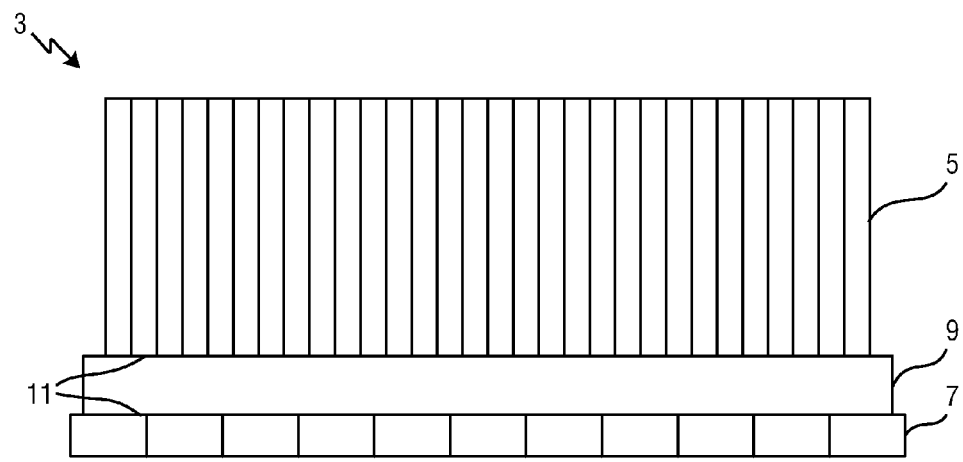
FIG. 2 shows a schematic illustration of a gamma ray detector in sectional view.

FIG. 2 illustrates one approach to construct a gamma ray detector 3 for coping with these effects. There is schematically illustrated a sectional view of a gamma ray detector 3 comprising a scintillator array 5 and a photodetector array 7 coupled thereto in light-sharing mode with a lightguide 9 interposed in between the scintillator array 5 and the photodetector array 7. These three components are coupled to one another. In the illustrated example the coupling is based on glue layers 11, in particular light conductive glue. FIG. 2 further illustrates that the sensitive area of the photodetector array 7 overlaps the limits of the scintillator crystal array 5. The photodetector is bigger than the scintillator array. This, however, has the disadvantage that the sensitive area of the gamma ray detector 3 becomes smaller. Further, imaging artifacts might result therefrom. FIG. 2 is limited to a schematic illustration wherein a number of other parts usually comprised in detectors are not illustrated. For instance, there may further be comprised electronic components (read out electronics) or, in case of a gamma ray detector used in SPECT imaging, a collimator.

Figure 3:
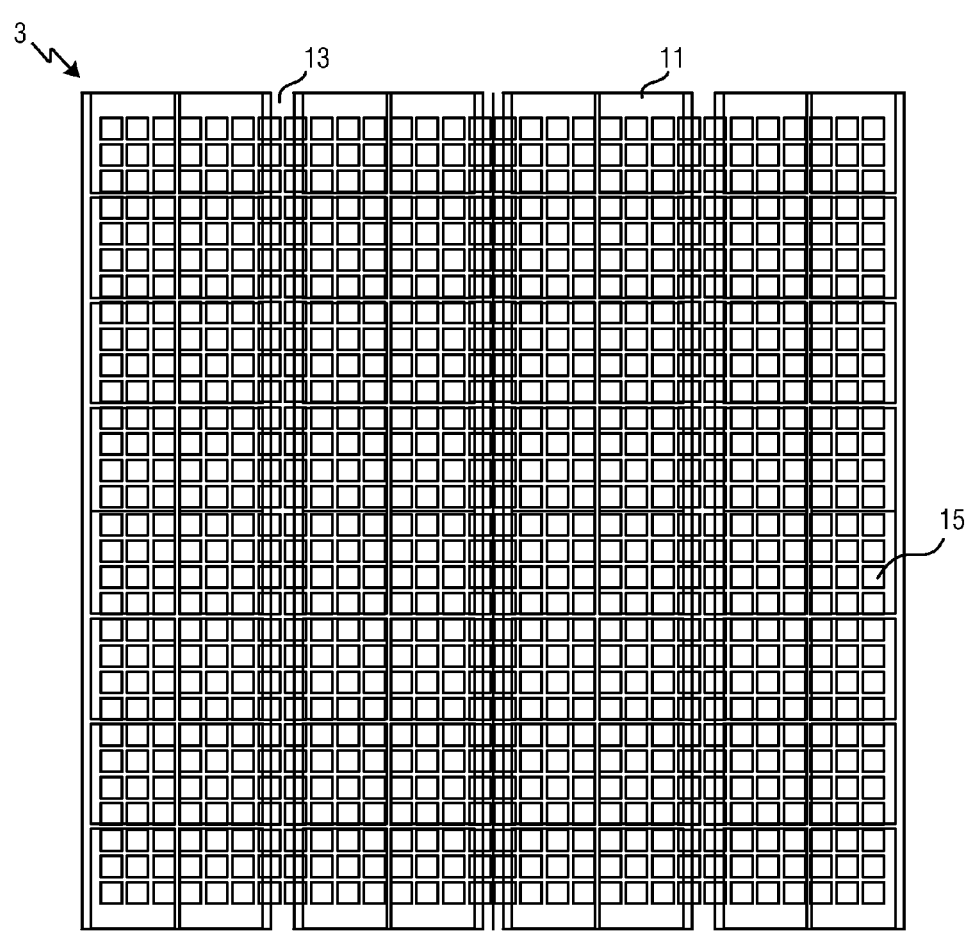
FIG. 3 shows a schematic illustration of a gamma ray detector in top view.

FIG. 3 shows a top view illustration of the gamma ray detector 3 wherein the irregular arrangement of the photosensitive elements 11 of the photodetector array and the dead spots 13 in between are schematically illustrated. The single scintillator array elements 15 are more or less affected by these dead spots 13 depending on their position with relation to the photosensitive elements 11 and the dead spots 13. The scintillator may particularly comprise an inorganic heavy-Z scintillating material such as LYSO, YAG(Ce) or BGO but may also comprise an organic material.

If the pitch of the scintillator crystal array is further reduced, the border problems may become even more critical. Then, distinguishing between the individual scintillator array elements may become more difficult.

The process of calibrating a gamma ray detector usually refers to assigning the position of the respective scintillator array element to a determined center-of-gravity position of the obtained spatial intensity distribution on the photodetector array. For instance, if a gamma ray impacts in a certain scintillator array element being situated at the border of the scintillator array it has to be considered that the above-explained border effect may result in a derivation of the calculated center-of-gravity position from the real (projected) position of the scintillator array element.

This, however, is usually not necessary in case Maximum Likelihood positioning is used. Maximum Likelihood positioning directly makes use of the obtained spatial intensity distribution caused by an incident gamma ray for determining the respective scintillator array element. Therefore, usually a previously obtained reference distribution for each individual scintillator array element is used. The obtained spatial intensity distribution is compared to the reference distributions for all scintillator array elements and it is determined which reference distribution has the highest similarity to the obtained spatial intensity distribution. A spatial intensity distribution thereby refers to the number of scintillation photons captured with the different photosensitive elements of the photodetector array (also referred to as charge distribution). As long as this distribution is sufficiently different for two different scintillator array elements, they can be separated. However, using the Maximum Likelihood positioning method requires determining the characteristic signal distributions for each individual scintillator array element. The set of reference distributions for each individual scintillator array element can be referred to as the light matrix.

Figure 4:
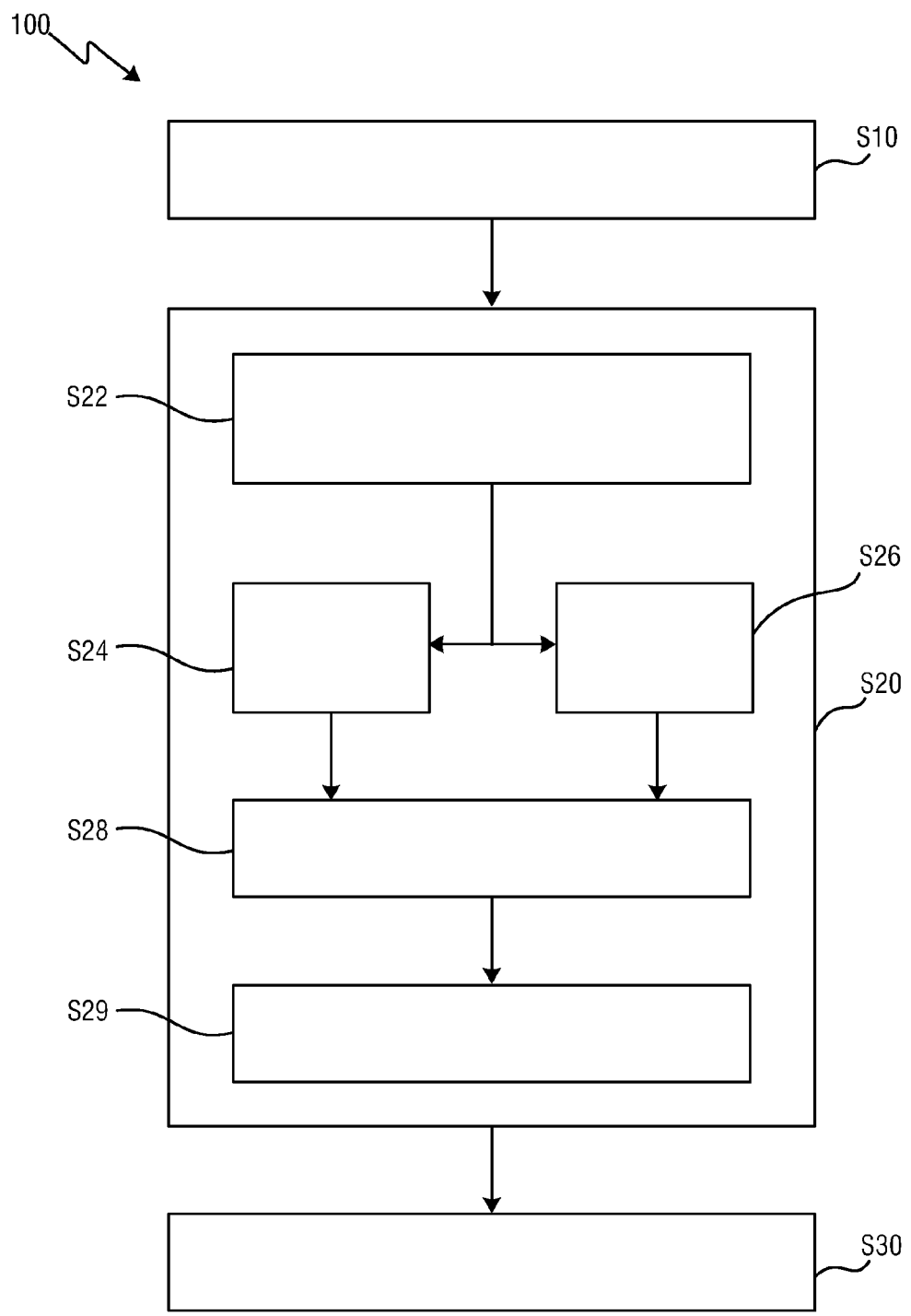
FIG. 4 shows a schematic illustration of a calibration method according to the present invention.

An embodiment of a calibration method 100 for a gamma ray detector according to the present invention is illustrated in FIG. 4. Initially, a number of spatial intensity distributions of scintillation photons emitted in response to multiple incident gamma rays are recorded (step S10). One possible approach for recording these spatial intensity distributions is by means of flooding the detector, i.e. placing it at a distance of a gamma ray source (point source) and irradiating it therewith for a certain amount of time. Based on these recorded spatial intensity distributions, the cumulative spatial intensity distributions of scintillation photons emitted in response to incident gamma rays in the scintillator array element are determined (step S20). Thus, for each individual scintillator array element the cumulative spatial intensity distribution is extracted from the flood map. Then, based on these individual cumulative spatial intensity distributions, a light matrix is determined (step S30) that includes the expected spatial intensity distributions for the elements of the scintillator array.

In the illustrated embodiment of the calibration method according to the present invention the step of determining the cumulative spatial intensity distributions (step S20), includes initially determining (step S22) sets of coincidentally emitted scintillation photons based on the recorded spatial intensity distributions. Thus, the events recorded during the flooding are separated by exploiting the particular points in time at which the photo conversion of the incident gamma ray occurred. All scintillation photons occurring more or less at the same time are grouped together and assumed to result from the same gamma ray. Based on these sets of coincidentally emitted scintillation photons there is then determined (step S24) the center-of-gravity position for each set of coincidentally emitted scintillation photons. Thus, the center-of-gravity position is determined for each incident gamma ray. Further, there is determined (step S26) the cumulative energy for each set. Determining (step S26) the cumulative energy may thereby in particular refer to integrating the values determined by the different photosensitive elements of the photodetector array. There is then performed (step S28) a clustering analysis based on the determined center-of-gravity positions and cumulative energies of the sets of coincidentally emitted scintillation photons.

In an alternative embodiment of a calibration method according to the present invention, it is also possible to perform the clustering analysis only based on the center-of-gravity positions. Additionally using the determined cumulative energy, however, may improve the differentiation between the single elements in the scintillator array. The performed clustering analysis may thereby be a standard clustering algorithm based, e.g., on hierarchical clustering, centroid-based clustering, distribution-based clustering, density-based clustering or, preferably, Maximum Likelihood Expectation Maximization clustering. For each cluster there is determined (step S29) the corresponding cumulative spatial intensity distribution. Thus, after the clusters have been identified, the events attributed to one cluster are again summed up (cumulated) and the cumulative spatial intensity distribution for all signal distributions belonging to one cluster is calculated. Determining (step S30) the expected spatial intensity distributions may thereby be particularly based on normalizing the cumulative spatial intensity distributions for each of the elements of the scintillator array (i.e. determining the average of the different signal distributions). The light matrix, i.e. the expected spatial intensity distributions for the different scintillator array elements, is then used in the Maximum Likelihood position estimation of incident gamma rays.

In yet another embodiment of a calibration method according to the present invention further parameters may be used in the clustering analysis. Apart from the energy or position values themselves (x- and y position, i.e. first moments of the signal distributions) it is possible to additionally or alternatively use parameters such as the standard deviation (i.e. second moment of the distributions of the energy or the position) or others (e.g. other moments such as skewness, kurtosis, $4^{th}$ or $5^{th}$ order moments, etc.) as an input for the clustering analysis. The present invention relates in particular to using any parameter derivable from the spatial signal distribution in the clustering analysis. By this, the clustering results may be improved.

The automatic identification of the position of the image of each scintillator array element (crystal pixel), i.e. the clustering, is a hard task. It should ideally run without any human intervention but still reliably recognize the different clusters, wherein each cluster is caused by (i.e. represents) exactly one scintillator array element. This is particularly difficult at the borders of the gamma ray detector where the center-of-gravity positioning is affected by the above-explained border affect. One possible clustering algorithm is the Maximum Likelihood expectation maximization (MLEM) as, e.g., presented in Fraley et al.: Software for Model-Based Cluster Analysis, Journal of Classification July 1999, Volume 16, Issue 2, pages 297-306. For the application of this algorithm, it might further be advantageous to partition the detected signal distributions prior to applying the algorithm. For instance, the events may be partitioned into groups which have their signal maximum over one specific photodetector element. In case of an 8×8 photodetector array this leads to 64 subsets.

FIG. 5 illustrates the clustering for an example of such a subset determined with the above-described detector design. There is illustrated the distribution of calculated center-of-gravity positions for multiple incident gamma rays. It can be seen that there are nine regions 17 with higher density of center-of-gravity positions over the illustrated single element of the photodetector array. FIG. 5, however, shows the recordings for a photodetector array element (partial flood map) at the border of the photodetector array. Thus, the regions with higher density on the left hand side overlap significantly. The illustrated maxima 19 and partitioning lines 21 are thereby passed to the MLEM algorithm as priors, i.e. initial information.

FIG. 6 illustrates the result of the MLEM algorithm, i.e. the classification of the events into clusters. Nine clusters (corresponding to the regions with higher density) are identified based on the events having their maximum over the one photodetector array element. The centers of the ellipses 23 mark the most likely center-of-gravity positions of the corresponding scintillator array elements. The ellipses 25 mark one standard deviation. There are nine identified scintillator array crystals and an additional noise component, i.e. events that are not attributed to a specific cluster. This corresponds to the original number of nine crystal elements arranged over this photodetector array element. It can, however, also be seen in FIG. 6 that some of the clusters strongly overlap.

FIG. 7 illustrates an example for the energy histograms for two of the clusters, e.g. clusters 26a and 26b. On the left side, there is illustrated the energy histogram 27 of one cluster, on the right side there is illustrated the energy histogram 29 of a cluster adjacent to this cluster. Both energy histograms show a distinct energy peak (photo peak) at two specific and distinct energy levels e1 and e2. The energy spectrum of the first cluster 27, however, also shows a second peak 31 at energy level e2. This peak is due to events from the second cluster that are misclassified and attributed to the first (nearby) cluster. This may lead to unclear or ambiguous results. One possibility to avoid this problem is to perform the clustering not only based on the center-of-gravity positions but also on the energy values.

Figure 8:
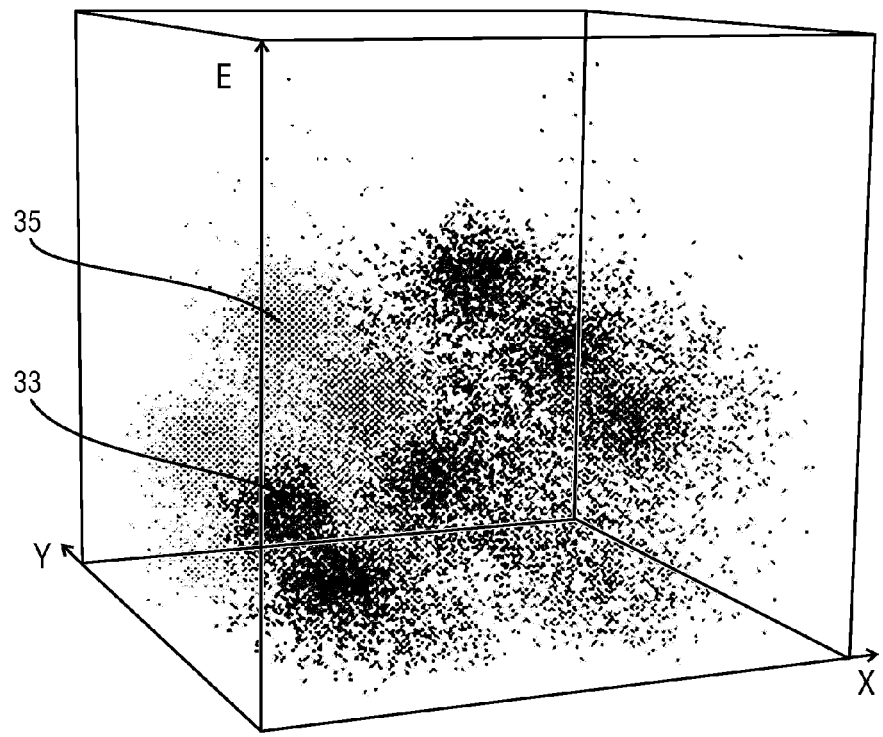
FIG. 8 shows an illustration of the result of a 3D clustering analysis.

FIG. 8 illustrates a scatter plot for the same data in three-dimensional (3D) space, wherein also the energy values of the different events is illustrated. For each data point there is not only determined the spatial (2D) position, but also the cumulative energy. Again, nine clusters are identified. It can be seen that the determined energy values are different, i.e. represent good distinguishing features, for the different clusters. For instance, the energy values of the data points (i.e. gamma ray events or respectively the corresponding center-of-gravity positions of the spatial intensity distribution) classified into cluster 33 are clearly lower than the values of the events classified into cluster 35. As explained above, various effects such as differences in the material or differences in the design may be the reason therefor.

Figure 9:
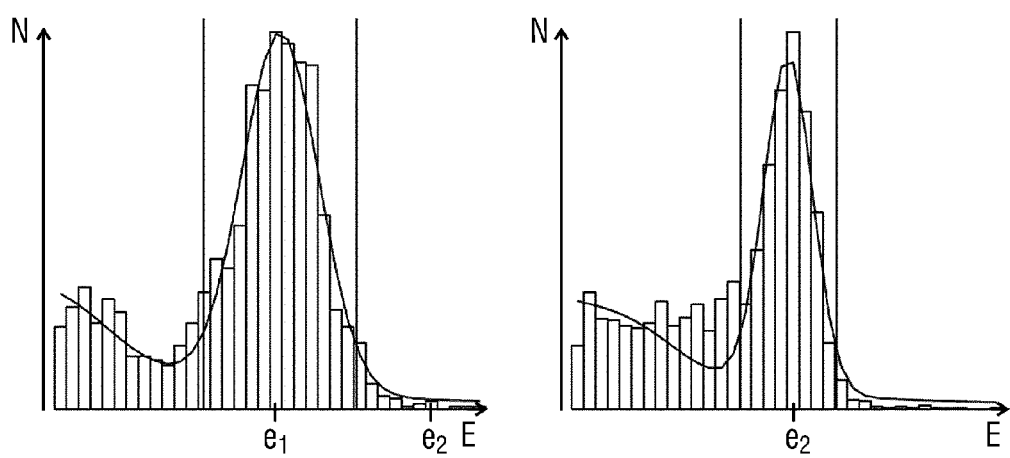
FIG. 9 illustrates an example for the energy spectra of two clusters determined based on 3D clustering.

FIG. 9 illustrates the energy spectra of the two clusters corresponding to the same scintillator array elements as illustrated in FIG. 7. The clustering illustrated in FIG. 9 is, however, additionally based on the energy. It can be seen that the first cluster does not anymore comprise the misclassified data points of the second photo peak 31 shown in FIG. 7. The events contributing to the histogram peak at energy level e2 are now (correctly) assigned to the adjacent cluster illustrated on the right side of FIG. 2. This results in higher sensitivity and less image artifacts, in particular when using filtered back projection image reconstruction. If the clustering approach is used as a basis for the Maximum Likelihood position determination, the results in terms of correctly identified positions can be significantly improved. An additional benefit of the 3D clustering is that it is more robust and less manual intervention by an operator is required during calibration.

It is, however, also important and may increase the accuracy of the determined positions for the incident gamma rays on the scintillator to use suitable input data during calibration as well as during operation of a gamma ray detector. The clustering results as well as the therefrom resulting Maximum Likelihood position estimation results have shown to be more accurate if the lightguide 9 in FIG. 2 comprises a high refractive index material with a refractive index higher than the refractive index of the photodetector array's 7 entrance window. Such a material may include sapphire glass. Such sapphire glass allows transmitting more light to the photodetector array elements close to the scintillator array element that was hit by the gamma ray. In further embodiments of the present invention there may be used other materials with a high refractive index, in particular high refractive index glasses.

Figure 10:
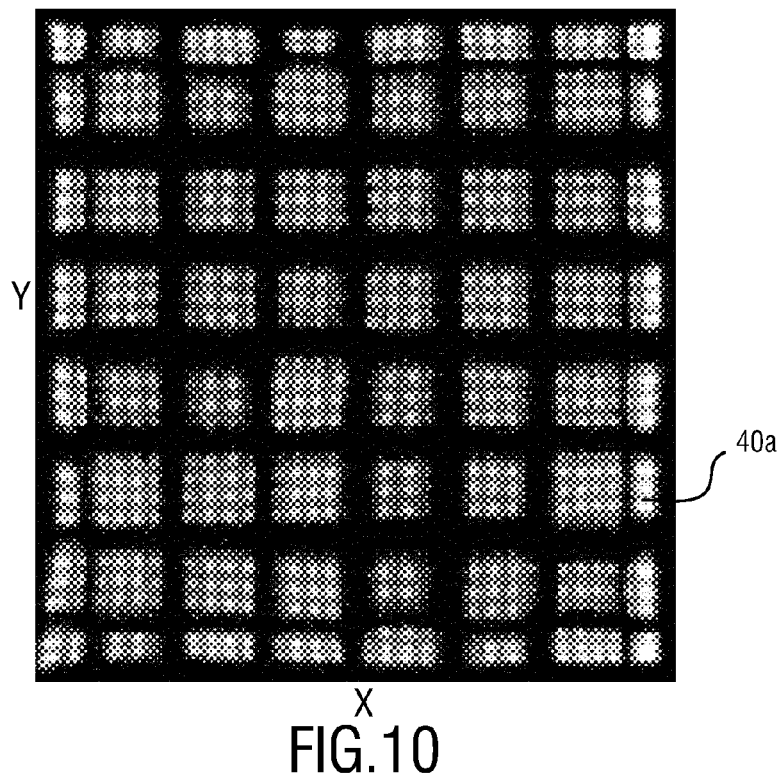
FIG. 10 shows an example for a flood map representing the center-of-gravity positions obtained with a 22×22 scintillator crystal array with a lightguide of lower refractive index.
Figure 11:
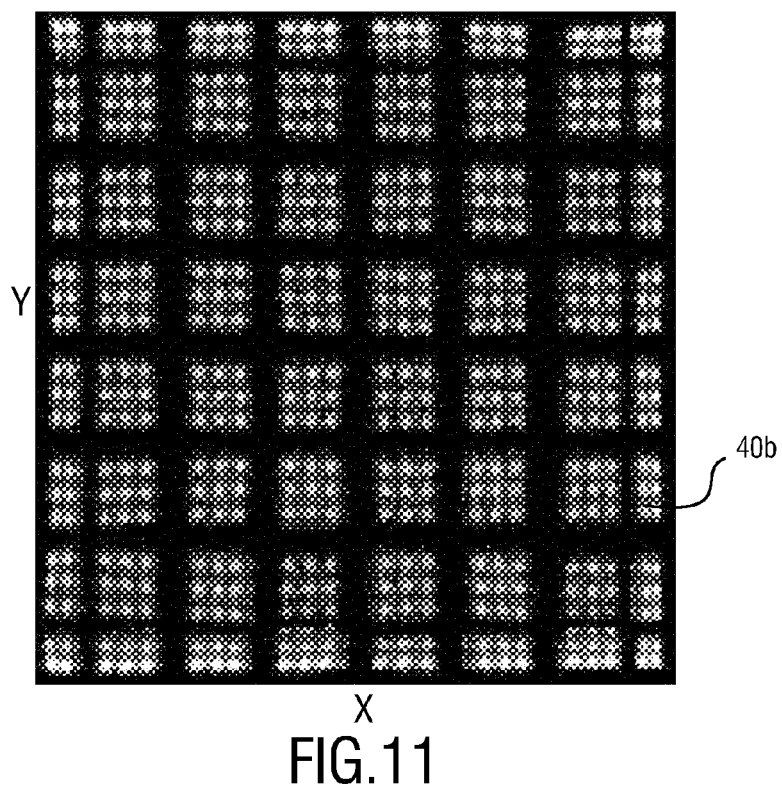
FIG. 11 illustrates example for a flood map representing the center-of-gravity-positions obtained with a 22×22 scintillator crystal array with a lightguide of higher refractive index.

FIG. 10 illustrates an exemplary flood map obtained for a lightguide of 2 mm thickness comprising BoroFloat glass with a refractive index of about 1.5. The scintillator crystal array in this example comprises 22×22 elements. It can be seen that the clusters overlap to a high extent in particular at the borders of the photodetector array. In contrast thereto, FIG. 11 shows a corresponding flood map obtained by means of a gamma ray detector comprising a sapphire glass (refractive index 1.8) lightguide of 2 mm thickness. If, e.g. the clusters in the lower right corner 40a and 40b are considered it becomes apparent that the bright spots are better separated if the higher refractive material lightguide is used (FIG. 11). This leads to better, i.e. clearer, results in the clustering analysis.

Figure 12:
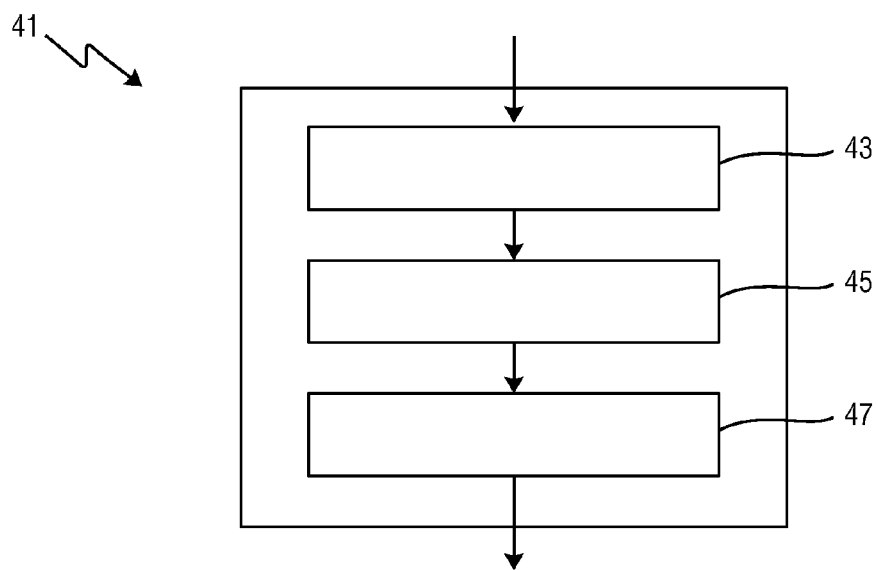
FIG. 12 shows a schematic illustration of a calibration module according to the present invention.

FIG. 12 schematically illustrates a calibration module 41 for a gamma ray detector according to the present invention. This calibration module comprises a recorder 43 for recording the spatial intensity distributions of scintillation photons emitted by the scintillator array in response to multiple incident gamma rays. There is further illustrated a cumulation module 45 for determining the cumulative spatial intensity distributions of scintillation photons emitted in response to incident gamma rays in a scintillator array element as lined out above. Still further, there is illustrated a matrix module 47 for determining a light matrix including expected spatial intensity distributions of scintillation photons for different scintillator array elements based on the determined cumulative spatial intensity distributions. The module 41 allows determining a light matrix representing the expected spatial intensity distributions for the gamma ray events in the individual scintillator array elements. This matrix particularly comprises the information of how the charges are distributed over the different photodetector array elements if a particular scintillator array element is hit by a gamma ray. The matrix may particularly be based upon a clustering analysis as outlined above.

Figure 13:
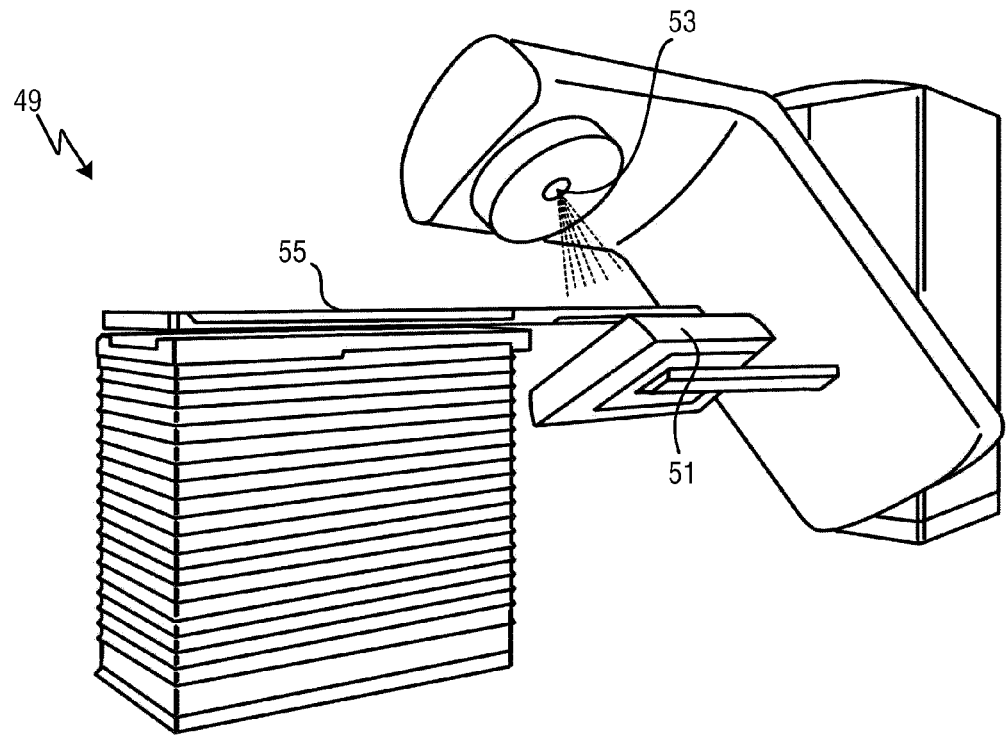
FIG. 13 illustrates a first embodiment of a medical imaging device according to the present invention.

FIG. 13 illustrates a medical imaging device 49 representing one possible application area of a gamma ray detector according to the present invention. The illustrated imaging device 49 comprises a gamma ray detector 51 including a calibration module as described above. The illustrated medical imaging device 49 further comprises a gamma ray source 53 for emitting gamma rays. Still further, there is illustrated an adjustable patient support 55 for supporting a patient being subject to treatment, i.e. imaging, by means of the medical imaging device 49. The illustrated device 49 thereby detects gamma rays emitted by an external gamma ray source 53. This may, e.g. be the case for a CT device.

A similar setup may also be used for the calibration of the device in order to obtain the flood maps.

Figure 14:
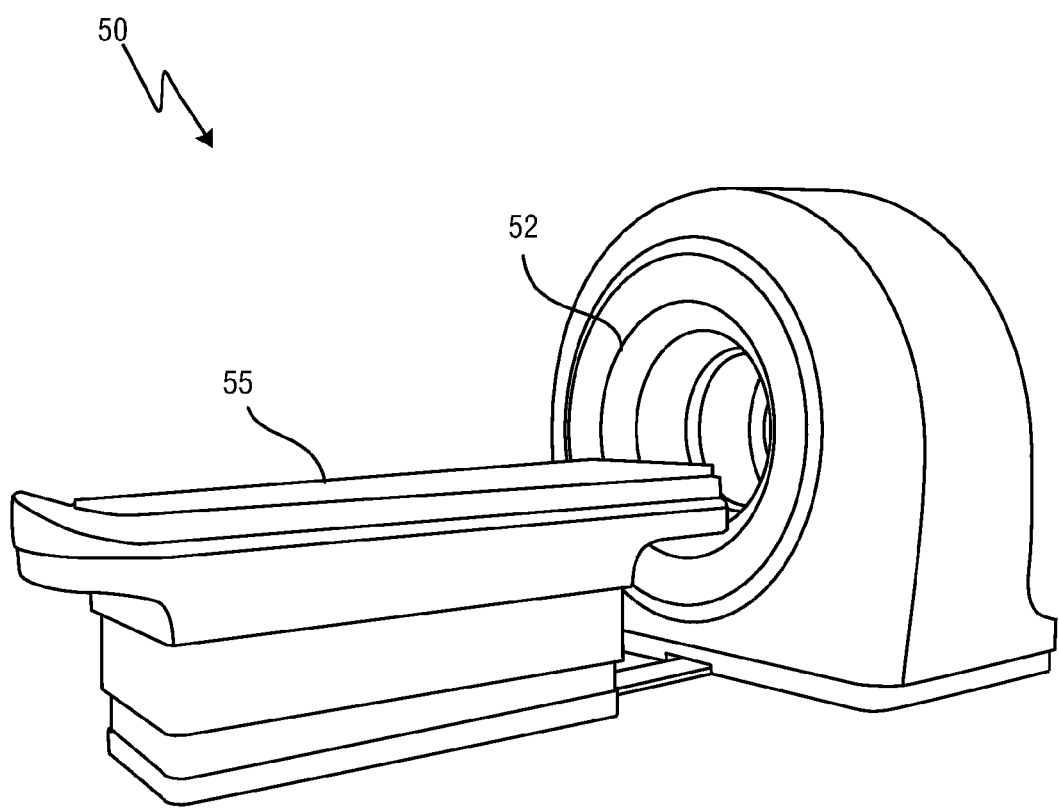
FIG. 14 illustrates another embodiment of a medical imaging device.

It is also advantageous to calibrate a detector for the use in other medical imaging devices such as PET, PET/CT, SPECT, SPECT/CT, PET/MR or SPECT/PET/CT by making use of a method or module according to the present invention. In FIG. 14 there is illustrated another medical imaging device 50 comprising another embodiment of a gamma ray detector 52 according to an embodiment of the present invention. The illustrated device also comprises a patient support 55. Different from the device illustrated in FIG. 13, a PET or SPECT device usually detects particles and in particular gamma rays emitted within the object to be imaged. For instance, a patient may be administered a radioactive tracer substance and a detector calibrated according to the present invention might be used to determine the spatial position of this tracer substance in the patient. It may also be possible to detect, where this tracer substance interacts with organs or other substances in the object, i.e. the patient, to be imaged. Thereby PET devices usually comprise a detector ring 52 for detecting two simultaneously impinging gamma rays. SPECT devices usually detect single particles by means of a single or two detector elements. In case of PET or SPECT devices, it may be possible to individually calibrate each detector tile, i.e. each individual gamma ray detector in a detector ring or in a multi-head detector. It may also be possible to calibrate by inserting a radiation calibration substance, e.g. $Na^{22}$, into the sensitive area (i.e. detection area or area close to the isocenter) of the device. Based thereupon the flood map is determined.

Also other unimodal or multimodal imaging devices may exploit the calibration method according to the present invention.

Basically the same approach is used for devices used in preclinical studies. Such studies are usually carried out with small animals such as mice or rats. The used detectors (e.g. SPECT, PET, PET/CT, SPECT/CT, PET/MR or SPECT/PET/CT imaging devices) are thereby usually smaller which may result in an increased image resolution at the isocenter. The basic considerations are, however, equivalent. It may be particularly useful to use the present invention in the context of small animal PET. In particular for small animal PET studies, the structures to be imaged are usually smaller than for applications on humans. Thus, in order to provide comparable and applicable results, small animal studies usually require a higher resolution.

In the calibration of PET (or SPECT or others) imaging devices usually mono-energetic gamma rays are used if the energy and the anger positions are to be used as distinguishing features as proposed by the present invention. For PET, calibration is preferably done in coincidence or with high activity sources. This is because there are scintillators that are themselves slightly radioactive (LYSO). This radioactivity (beta and gamma particles) is seen by the same scintillator. Using coincidence radiation or using high activity calibration sources allows filtering out or significantly outnumbering these events. Once the spatial intensity distribution is acquired, mono-energetic radiation can be omitted since the energy is also computed by the Maximum Likelihood method.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable non-transitory medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. A method of diagnostic imaging using a gamma ray detector including a scintillator array for emitting scintillation photons at photo conversion positions in response to incident gamma rays and a photodetector array coupled thereto in light-sharing mode for determining a spatial intensity distribution of scintillation photons, said method comprising:
   in a memory, recording spatial intensity distributions of scintillation photons emitted by the scintillator array in response to multiple incident gamma rays;
   with a computer, determining sets of coincidently emitted scintillation photons from the recorded spatial intensity distributions;
   with the computer, determining for the sets of coincidently emitted scintillation photons center-of-gravity positions and cumulative energies;
   with the computer, performing a clustering analysis based on the determined center-of-gravity positions and cumulative energies to obtain clusters of gamma ray events attributed to a scintillator array element;
   with the computer, cumulating for a cluster the spatial intensity distributions to determine a cumulative spatial intensity distribution of scintillation photons emitted in response to incident gamma rays in the scintillator array element;
   with the computer, determining a light matrix including expected spatial intensity distributions of scintillation photons for different scintillator array elements based on the cumulative spatial intensity distributions;
   generating spatial intensity distributions from gamma rays received from an imaged subject with the gamma ray detector;
   operating on the spatial intensity distributions using the light matrix to generate corrected spatial intensity distributions; and
   reconstructing the corrected spatial intensity distributions in a diagnostic image of the imaged subject.

2. The method according to claim 1, wherein performing the clustering analysis includes using a standard clustering algorithm based on hierarchical clustering, centroid based clustering, distribution based clustering, density based clustering or Maximum Likelihood Expectation Maximization Clustering.

3. The method according to claim 1, further including:
   with the computer, determining the expected spatial intensity distributions based on normalizing the determined cumulative spatial intensity distributions.

4. The method according to claim 1, further including:
   with the computer, dividing the determined sets of coincidently emitted scintillation photons into groups including all sets of coincidently emitted scintillation photons with their centers-of-gravity over the same photodetector array element; and
   with the computer, performing a separate clustering analysis for each group.

5. The method according to claim 1, wherein the incident gamma rays are emitted by a point source.

6. The method according to claim 1, wherein the computer is controlled by a computer program stored on a non-transitory computer readable medium.

7. A calibration module for a gamma ray detector including a scintillator array for emitting scintillation photons at photo conversion positions in response to incident gamma rays and a photodetector array coupled thereto in light-sharing mode for determining a spatial intensity distribution of scintillation photons, said module comprising:
   a recorder for recording spatial intensity distributions of scintillation photons emitted by the scintillator array in response to multiple incident gamma rays;
   a computer configured to:
      determine sets of coincidently emitted scintillation photons from the recorded spatial intensity distributions, determine for the sets of coincidently emitted scintillation photons center-of-gravity positions and cumulative energies, perform a clustering analysis based on the determined center-of-gravity positions and cumulative energies to obtain clusters of gamma ray events attributed to a scintillator array element, cumulate for a cluster the spatial intensity distributions to determine a cumulative spatial intensity distribution of scintillation photons emitted in response to incident gamma rays in the scintillator array element, and
      determine a light matrix including expected spatial intensity distributions of scintillation photons for different scintillator array elements based on the cumulative spatial intensity distributions.

8. A gamma ray detector comprising
   a scintillator array for emitting scintillation photons at photo conversion positions in response to incident gamma rays;
   a photodetector array coupled to the scintillator array in light-sharing mode for determining a spatial intensity distribution of scintillation photons; and
   a calibration module according to claim 7.

9. The gamma ray detector according to claim 8, further comprising a lightguide interposed between the scintillator array and the photodetector array for guiding the emitted scintillation photons from the scintillator array to the photodetector array.

10. The gamma ray detector according to claim 9, wherein the lightguide comprises a high refractive index material with a refractive index higher than the refractive index of the photodetector array's entrance window.

11. The gamma ray detector according to claim 10, wherein the high refractive material includes sapphire Glass.

12. The gamma ray detector according to claim 8, wherein the computer is further configured to determine a gamma ray intensity image from a Maximum Likelihood Estimation of the photo conversion positions of incident gamma rays based on the light matrix.

13. A medical imaging device comprising:
a gamma ray detector according to claim 8,
wherein the gamma ray detector is disposed to receive gamma rays from a subject and generate signals indicative thereof and operate on the signals with the generated light matrix.

14. The calibration module according to claim 7, wherein the computer is further configured to divide the sets of concurrently emitted scintillation photons into groups including all sets of coincidently emitted scintillation photons with their centers-of-gravity over the same photodetector array element and perform a separate clustering analysis for each group.

15. A gamma ray imaging device comprising:
a gamma ray detector including a scintillator array configure to emit scintillation photons at photo conversion positions in response to incident gamma rays and a photodetector array coupled thereto in light-sharing mode and configured to determine a spatial intensity distribution of scintillation photons;
the calibration module according to claim 7 configured to generate the light matrix in a calibration mode from gamma rays received from a calibration gamma ray source; and
wherein in an imaging mode, the gamma imaging device is configured to operate on the spatial intensity distributions generated by gamma rays from an imaged subject to generate light matrix corrected spatial intensity distributions and to reconstruct the matrix corrected spatial intensity distribution into a diagnostic image.

16. A non-transitory computer-readable medium carrying program code configured to control a computer to:
record spatial intensity distributions of scintillation photons from a gamma ray detector including a scintillator array which emits scintillation photons at photo conversion positions in response to incident gamma rays and a photodetector array coupled thereto in light-sharing mode which determines the spatial intensity distribution of scintillation photons,
determine sets of coincidently emitted scintillation photons from the recorded spatial intensity distributions;
determine for the sets of coincidently emitted scintillation photons center-of-gravity positions and cumulative energies;
perform a clustering analysis based on the determined center-of-gravity positions and cumulative energies to obtain clusters of gamma ray events attributed to a scintillator array element;
cumulate for a cluster the spatial intensity distributions to determine a cumulative spatial intensity distribution of scintillation photons emitted in response to incident gamma rays in the scintillator array element;
determine a light matrix including expected spatial intensity distributions of scintillation photons for different scintillator array elements based on the cumulative spatial intensity distributions;
generate spatial intensity distributions from gamma rays received from an imaged subject with the gamma ray detector;
operate on the spatial intensity distributions using the light matrix to generate corrected spatial intensity distributions;
reconstruct the corrected spatial intensity distributions in a diagnostic image of the imaged subject.

17. A gamma detector comprising:
a scintillator array configured to emit scintillation photons in response to incident gamma radiation;
a photodetector array coupled to the scintillator array in a light sharing mode;
one or more computer processors configured to:
determine spatial intensity distributions of the scintillation photons emitted by the scintillator array in response to incident gamma radiation,
determine sets of coincidently emitted scintillation photons from the spatial intensity distributions,
determine for the sets of coincidently emitted scintillation photons center-of-gravity positions and cumulative energies,
perform a clustering analysis based on the determined center of gravity positions and the cumulative energies to obtain clusters of gamma events attributed to a scintillator array element,
cumulate the spatial intensity distributions for the cluster to determine a cumulative spatial intensity distribution of scintillation photons emitted in response to incident gamma radiation in the scintillator array element, and
generate a light matrix indicative of an expected spatial intensity distribution of scintillation photons for each scintillator element of the scintillator array based on the cumulative spatial intensity distributions.

18. The gamma detector according to claim 17, wherein the one or more computer processors are further configured to:
divide the determined sets of coincidently emitted scintillation photons into groups including all sets of coincidently emitted scintillation photons with their centers of gravity over the same photodetector array element; and
perform a separate clustering analysis on each group.

19. The gamma detector according to claim 17, wherein the scintillation elements are further configured to receive gamma radiation from a subject in an imaging region during imaging and wherein the one or more computer processors are further configured to:
operate on signals from the photodetector array with the generated light matrix to generate matrix corrected data; and
reconstruct the matrix corrected data into an image representation.

* * * * *